United States Patent Office 2,971,025
Patented Feb. 7, 1961

2,971,025

NOVEL ETHER DERIVATIVES OF DI(HYDROXY-AROMATIC)ALKYLIDENE CARBOXYLIC ACIDS

Alfred R. Bader, Milwaukee, Wis., assignor, by mesne assignments, to S. C. Johnson & Son, Inc., Racine, Wis., a corporation of Wisconsin No Drawing. Filed June 14, 1956, Ser. No. 591,273

4 Claims. (Cl. 260—520)

This invention relates to novel ether derivatives of di(hydroxyaromatic)alkylidene carboxylic acids, and pertains more particularly to the allyl and methallyl ethers of said acids.

In a copending application, Serial No. 377,002, filed August 27, 1953, it is disclosed that novel phenolic compounds, more specifically, di(hydroxyaromatic)alkylidene carboxylic acids, can readily be prepared by the reaction of phenols with keto carboxylic acids, preferably in the presence of a relatively strong mineral acid catalyst, such as hydrochloric acid, phosphoric acid, sulfuric acid, or the like. The reaction disclosed in the copending application is believed to proceed substantially in accordance with the following equation, wherein phenol and levulinic acid are used for illustrative purposes.

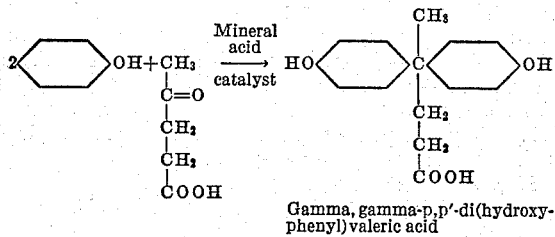

Gamma, gamma-p,p'-di(hydroxyphenyl)valeric acid

It has now been discovered that the novel compounds obtained by the reaction of keto acids and phenols in accordance with the process disclosed in the copending application, react readily with allyl halides or methallyl halides, to give novel diallyl or dimethallyl ethers, which are useful for many purposes. For example, they can be polymerized in the presence of catalysts such as the peroxygen compounds to give linear polymeric materials having carboxyl groups spaced along the polymer chain, which groups can further be reacted to form ester groups, with amines or ammonia to form amides, with epichlorohydrins to form epoxy type resins useful in coating compositions, or with other chemical compounds. Many of the polymers obtained are useful as the film forming components of coating compositions. The diallyl and dimethallyl ethers can also be copolymerized with other monomers such as styrene and the like to form useful interpolymers. The unique properties of the novel compounds of this invention are believed due to the presence of the free carboxyl group in the molecule.

The reaction of di(hydroxyaromatic)alkylidene carboxylic acids with allyl or methallyl halides in accordance with this invention may be depicted structurally as follows, wherein gamma, gamma-p,p'-di(hydroxyphenyl) valeric acid (also known as 4,4-bis(4-hydroxyphenyl)-pentanoic acid) and allyl chloride are utilized for illustrative purposes.

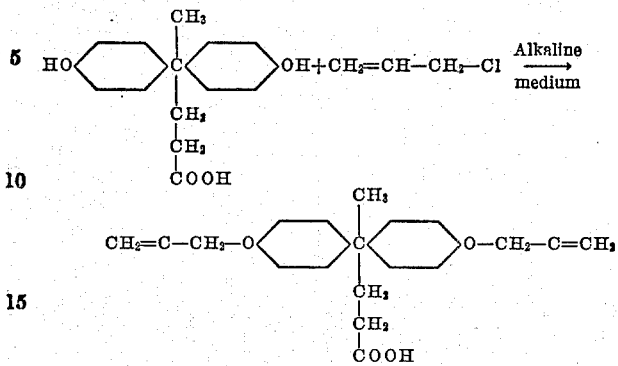

In preparing the novel ethers of this invention, any compound having the structure

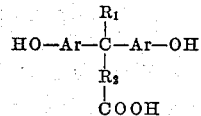

wherein Ar is an arylene radical, preferably phenylene, $R_1$ is an alkyl radical, preferably containing from 1 to 4 carbon atoms, and $R_2$ is an alkylene radical containing at least 2 carbon atoms, and preferably 2 to 6 carbon atoms, and having its free valences on different carbon atoms, may be employed. The preferred compound of this class is the gamma, gamma-p,p'-di(hydroxyphenyl)-valeric acid depicted structurally hereinabove. However, other compounds of the same general class may also be used with good results, for example, compounds obtained by utilizing other keto acids, such as lactarinic acid, mesitonic acid, delta-keto caproic acid, geronic acid, or the like, or other phenols such as cresol (ortho, meta, or para), carvacrol, thymol, dihydric phenols such as the catechols, resorcinol, hydroquinone or the like, or trihydric phenols such as pyrogallol. The phenol employed must have at least one free or available ring hydrogen atom in order for the reaction with the keto acid to take place.

The novel ethers prepared according to this invention possess the general structure

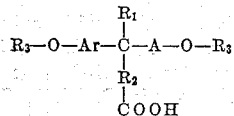

wherein Ar, $R_1$ and $R_2$ have the significance given hereinabove, and $R_3$ is a member of the class consisting of allyl and methallyl radicals.

In carrying out the reaction of a di(hydroxyaromatic)-alkylidene carboxylic acid with either an allyl or methallyl halide, an alkaline medium is employed. Among the alkaline materials which may be utilized are sodium hydroxide, potassium hydroxide, barium hydroxide, sodium carbonate, potassium carbonate, ammonia, hexamethylenetetraamine, and the like. The quantity of catalyst employed is generally such that there is present approximately 1 mole of catalyst for each mole of the allyl or methallyl halide. However, the ratio may be as low or lower than 0.25 mole of catalyst per mole of the allyl of methallyl halide, or as high or higher than 3 moles of catalyst per mole of the allyl or methallyl halide.

The molar ratio of the allyl or methallyl halide to the diphenolic acids utilized in carrying out the reaction of this invention may be varied widely. Best results are obtained when about 4.0 moles of the unsaturated halide are utilized for each mole of the diphenolic acid in the reaction mixture. However, the ratio may be as low or lower than 0.5 to 1.0, or as high or higher than 5.0 to 1.0.

The reaction is preferably carried out by dissolving the diphenolic acid in a solution of the alkaline catalyst in water and then adding the unsaturated halide slowly thereto with stirring and gentle heating. The reaction mixture is then heated to reflux for a period of about 1 to 3 hours and cooled, acidified with a mineral acid such as hydrochloric acid, sulfuric acid, or the like and extracted with toluene. The toluene extract is then washed and distilled to give the product, normally in the form of an oil. The reaction can also be carried out readily simply by admixing all of the reactants and alkali in an aqueous solution and allowing the resulting mixture to stand at room temperature, although a longer reaction time will be required than when reflux temperatures are employed.

The following examples illustrate more fully the preparation of di(hydroxyaromatic)alkylidene carboxylic acids and the preparation of diallyl and dimethallyl ethers by the reaction of allyl or methallyl halides with such acids. The examples are not, however, intended to limit the scope of the invention, for there are, of course, numerous possible variations and modifications.

Example I

A cooled mixture of 94 grams (1 mole) of phenol, 58 grams (0.5 mole) of levulinic acid, 45 grams of water and 180 grams of concentrated sulfuric acid was stirred at 25° C. for 20 hours. The reaction is slightly exothermic. The mixture was diluted with water and extracted with ethyl acetate. The organic solution was in turn extracted exhaustively with aqueous sodium bicarbonate, stripped and distilled to yield 20 grams of unreacted phenol. The almost colorless bicarbonate extract was acidified, extracted with ether and the washed ether extract stripped in vacuo to yield 87 grams (0.30 mole, 77 percent yield based on unrecovered phenol) of an almost colorless glass, M.P. ca. 90° C., acid value found 192, calculated 195, which was the amorphous form of gamma, gamma-p,p'-di(hydroxyphenyl)valeric acid.

The amorphous product thus obtained was crystallized solvent free from a mixture of toluene and acetone, M.P. 168° C. to 170° C. It formed hard, white rosettes from water containing a trace of acetic acid, M.P. 171° C. to 172° C., and could also be crystallized well from mixtures of heptane and ethyl acetate or benzene and acetone. Hot solutions of the amorphous modification in aromatic hydrocarbons when seeded with solvent-free crystals, yielded the crystals, M.P. 171° C. to 172° C., on cooling.

*Analysis.*—Calculated for $C_{17}H_{18}O_4$: C, 71.31 percent; H, 6.34 percent. Found: C, 70.99, 70.94 percent; H, 6.62, 6.46 percent.

Example II

Eighty grams (0.28 mole) of gamma, gamma-p,p'-di(hydroxyphenyl)valeric acid was dissolved in a solution of 56 grams (1 mole) of potassium hydroxide in 500 cc. of water, and 90 grams (1.2 moles) of allyl chloride was slowly added with stirring and gentle heating. The reaction mixture was then heated to reflux for 2 hours and another 20 grams of allyl chloride added. Refluxing was continued for an additional ½ hour, after which the excess allyl chloride was removed, the reaction mixture cooled, acidified with 200 cc. of 1:1 hydrochloric acid, and extracted with toluene. The toluene extract was washed and stripped to give the product in the form of a yellow oil in a yield of 93 grams. The product was identified as gamma, gamma-p,p'-di(allyloxyphenyl)valeric acid having a hydroxyl value of 70.8 and an acid value of 140.

Example III

Example II was repeated substituting methallyl chloride for the allyl chloride of the previous example. A substantial yield of gamma, gamma-p,p'-di(methallyloxyphenyl)valeric acid was obtained.

Similarly, when other di(hydroxyaromatic)alkylidene carboxylic acids are substituted in the examples, good results are obtained. Likewise, other allyl or methallyl halides such as allyl iodide or methallyl iodide, allyl bromide or methallyl bromide can be substituted for the chlorides of the specific examples.

The products obtained in the foregoing manner react readily with alcohols in the presence of an esterification catalyst such as toluenesulfonic acid to give esters in substantially quantitative yields. An epoxy resin derivative of the compound of Example II forms hard, clear films when spread on a glass surface and baked at temperatures of about 300° F.

Although specific examples of the invention have been set forth hereinabove, it is not intended that the invention be limited solely thereto, but to include all of the variations and modifications falling within the scope of the appended claims.

This application is a continuation-in-part of copending application, Serial No. 377,002, filed August 27, 1953.

I claim:

1. A compound having the general formula

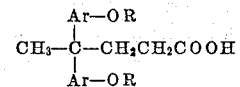

wherein Ar is a phenylene radical coupled through the aromatic nucleus thereof and containing as substituted substituents only lower alkyl groups and R is a member of the class consisting of allyl and methallyl radicals; the radicals —OR being in a position para to the point of attachment of the Ar entity to the aliphatic chain.

2. The compound of claim 1 wherein Ar is a phenylene radical containing only ring hydrogen.

3. γ,γ-p,p'-di(allyloxyphenyl) valeric acid.

4. γ,γ-p,p'-di(methallyloxyphenyl) valeric acid.

References Cited in the file of this patent

UNITED STATES PATENTS

| | | |
|---|---|---|
| 2,499,920 | Hunter et al. | Mar. 7, 1950 |
| 2,691,044 | Kolling et al. | Oct. 5, 1954 |
| 2,703,329 | Schultz | Mar. 1, 1955 |

FOREIGN PATENTS

| | | |
|---|---|---|
| 978,016 | France | Nov. 22, 1950 |

OTHER REFERENCES

Kharasch et al.: College Chemistry, pages 98–99 (1942).

Hackh's Chemical Dictionary, 3rd Ed., page 175 (1944).

Behrens et al.: Chem. Absts., vol. 43, cols. 2271–2273 (1949).

Quelet et al.: Chem. Absts., vol. 44, col. 5331 (1950).

Wagner et al.: Synthetic Organic Chemistry, pages 226–227 (1953).

Surrey: Name Reactions, pages 169–170 (1954).

Bader et al.: J.A.C.S. 76, pages 4465–6 (1954).

UNITED STATES PATENT OFFICE
CERTIFICATE OF CORRECTION

Patent No. 2,971,025                            February 7, 1961

Alfred R. Bader

It is hereby certified that error appears in the above numbered patent requiring correction and that the said Letters Patent should read as corrected below.

Column 1, line 15, for "either" read -- ether --; column 3, line 4, for "diphenolic acids" read -- Diphenolic Acid --; lines 7 and 12, for "diphenolic acid", each occurrence, read -- Diphenolic Acid --.

Signed and sealed this 31st day of October 1961.

(SEAL)
Attest:

ERNEST W. SWIDER                                          DAVID L. LADD
Attesting Officer                                              Commissioner of Patents
                                                                                                                USCOMM-DC